Patented Feb. 8, 1944

2,340,955

UNITED STATES PATENT OFFICE 2,340,955

RUBBER COMPOSITION

Lyle M. Geiger, Braddock, Pa., assignor to The Neville Company, Pittsburgh, Pa., a corporation of Pennsylvania No Drawing. Application September 6, 1940, Serial No. 355,669

3 Claims. (Cl. 260—4)

This invention relates to compositions of rubber and certain resinous materials.

It is an object of the invention to provide rubber-resin compositions which are compatible in widely varying proportions of rubber and resin, whose properties may be varied from hardness through plasticity and tackiness to oily viscous bodies, which may be prepared or compounded easily, readily, and cheaply in a variety of ways, which are adapted to a wide variety of important commercial uses, and which as compared with prior rubber-resin compositions are of improved uniformity, appearance and aging characteristics, of greater compatibility, or in which desired properties are developed with lesser amounts of resin.

A further object is to provide solutions of rubber and resin in a volatile solvent which are productive of clear and smooth films, which may be utilized in numerous commercial applications.

Another object is to compound polymers, especially resinous polymers, of terpenes with rubber to provide compositions embodying the characteristics stated in the foregoing objects.

The invention is predicated upon my discovery that terpene polymers are especially and desirably compatible with rubber, and that their use in providing rubber-resin compositions confers properties which make the use of these polymers outstandingly advantageous for such purposes.

The term "terpene polymers" as used above and hereinafter, refers to the products resulting from the treatment of turpentine, or of pure terpenes or mixtures thereof such, for example, as fractions or mixtures of fractions of turpentine, boiling approximately within the range 154 to 187° C., with aluminum chloride or other metallic halides followed by purification of the polymer solution and subsequent distillation to recover the polymers formed. These polymers may be prepared, of course, by other means known to the art such as, for example, heat polymerization. Heat polymerization may take the form of heating the material to be polymerized at 250 to 260° C. for twelve hours in a closed system, preferably in the absence of air. It should be understood that I am not bound by any of these methods of preparation, as the invention resides in the combination of the polymer with rubber regardless of the origin or preparation of the polymer itself.

The resinous polymers are preferred, and most suitably the pinene resins, for which reason the invention will, for purposes of illustration, be described in detail with reference thereto. Several examples are included, however, to show the similarity of compatibility and use with other terpene resins.

The benefits which flow from the use of pinene resins for compounding with rubber may be indicated first by a general reference to advantages in comparison with resins ordinarily used for such purposes, and second by actual tests which demonstrate those and other features of the invention. For instance, rosin has been used extensively in compounding rubber. I have found that the substitution of pinene resin for rosin is advantageous because the products are of increased uniformity, enhanced appearance, and possess better aging characteristics. Also, pinene resins are strikingly more compatible with rubber than the coumar type resins and desirably replace them in rubber compounding; also, comparison as "tackifiers" or tack-producing agents for rubber shows that smaller amounts of pinene suffice to produce a given amount of tack. Moreover, compositions of rubber and ester gum or coumar type resins are cloudy at relatively low contents of resin whereas clear compositions are produced over the range from very low to very high proportions of pinene resins.

The amount of pinene or other terpene resin used will depend, as will be understood, upon the particular resin used, upon the properties desired, the presence and amount of other ingredients, and related factors. For the purposes of the invention, however, the pinene resin may make up from, say, about 5 or 10 per cent to about 80 per cent or more of the composition.

A further advantage of these pinene resins is that the compositions may be made up by milling or by melting the constituents together, or by the use of a common volatile solvent. For example, any proportion of the resin may be milled easily into crepe rubber. As the resin is introduced it softens the rubber, and at an early stage the composition is sticky when pressed, i. e., it possesses "tack." As the amount of resin is increased, the mixture becomes softer and more plastic with increasing tackiness. When softer polymers, i. e., soft resins, are used, the properties of the blends advance rapidly from tacky plastic masses to viscous oily bodies with little or no tack as the amount of resin is increased in relation to rubber.

Turning now to actual tests of the invention, crepe rubber was milled with various resins in the proportion of 80 per cent of rubber and 20 per cent of each resin. A list of the resins used and their melting points follows:

| Resin | Origin or source | Melting point (cube in mercury) |
|---|---|---|
| | | °C. |
| Beta pinene | Plasticized aluminum chloride polymer. | 85 to 95 |
| Coumarone-indene | Neville resin, R-17 | 85 to 95 |
| Ester gum | Paramet, pale #2 | |
| Gum rosin | "K," Taylor Lowenstien | |

The pinene resin composition exhibited long tack and was superior in this regard to the other materials. This composition was clear, and exhibited excellent adhesion to glass, being much better than the gum rosin or coumar in this regard. Both the ester gum and coumar compositions were cloudy. The gum rosin composition had short tack, and the tack of the coumar composition was only medium. Thus compositions according to the invention possess a combination of properties one or more of which are lacking in compositions made from the resins used heretofore for these purposes.

In another series of tests mixtures of 90 per cent of pinene resin and 10 per cent of crepe rubber were heated at 145° to 165° C. for 1¾ hours. The product was superior in clarity, homogeneity and tack to one made from coumarone resin, which has only slight solvent action upon rubber. Ester gum seems to be incapable of forming a solution with rubber by such a procedure. The pinene resin was also an excellent solvent for reclaimed rubber, whereas gum rosin was wholly inactive.

Tests have shown also that pinene resins and other terpene resins may be compounded in any ratio to rubber by the use of a common solvent, e. g., by adding the resin to a solution of rubber in toluene, petroleum benzine, or other volatile solvent. All proportions produce clear smooth films upon evaporation of the solvent, and the films vary from oily semi-fluid bodies to hard and slightly tacky bodies, depending on the proportions of rubber and resin and the melting point of the resin used. All these films maintain their clarity upon standing for prolonged periods of time, whereas the rosin-rubber films become opaque. Moreover, pinene resins produce much more tack than gum rosin or ester gum.

As illustrating the variations in film properties obtainable by varying the resin-rubber ratio, films were made from solutions of crepe rubber and pinene resin in toluene. The resin used had a melting point of 135° C. (cube in mercury method):

20 resin/80 rubber:
Film was tacky and strongly adhesive.
40 resin/60 rubber:
Film was tougher and adhesive enough to cause tearing of paper bonded with a thin film.
60 resin/40 rubber:
Film harder and slightly tacky but possessed definite pressure sensitive adhesive properties.
80 resin/20 rubber:
Film was hard, somewhat brittle, with slight tack.

To illustrate the similarity of the terpene resins generally to pinene resin, which has been referred to above by way of illustration and because of its commercial possibilities, solutions were made having solids contents of 60 per cent of the below-listed resins and 40 per cent pale crepe rubber. The solutions were clear in all cases. Films were cast on glass panels for observation.

| Resin prepared from— | Polymerization method | Melting point of resin | Film properties |
|---|---|---|---|
| | | °C. | |
| Alpha pinene | Aluminum chloride | 107 | Clear-medium tack. |
| Do | do | 86 | Clear-good tack. |
| Dipentene | do | 98 | Clear-excellent tack. |
| Wood turpentine | Heat polymerization | 5 | Clear-oily, no tack. |
| Gum turpentine | do | 10 | Do. |
| Beta pinene | do | 10 | Do. |
| Alpha pinene | do | 10 | Do. |
| Alpha and beta pinene. | Aluminum chloride | 145 | Clear-excellent tack. |

In still other tests various grades of beta pinene resin were cut with mineral oil to 60° to 70° C. M. P. and compounded with latex to produce uniform and homogeneous chewing gum bases having qualities of rubberiness and elasticity desirable for such purposes. Remarkably enough this was accomplished with compositions containing less than 30 per cent rubber solids.

Compositions of pinene resins and rubber may be modified also with other materials to adapt the compositions to particular uses, various modifying agents being known and used for generally similar purposes. As an example, mineral oil may be used. Thus, a composition of 45 per cent by weight of pinene resin of 135° C. M. P., 10 per cent of milled crepe rubber, and 45 per cent of white mineral oil was of such softness as to be suitable as a fly paper adhesive. By increasing the resin to 55 per cent and decreasing the oil to 35 per cent the product became strong, slightly tacky and pressure sensitive.

The use of various fillers, a practice well known to the art of rubber compounding, may be looked on as one of the various possible modifications. It has been found that common fillers and reinforcing agents may be easily compounded with pinene resin-rubber compositions. For example, zinc oxide was easily compounded with a composition of 40 parts of pinene resin and 60 parts of milled pale crepe rubber, complete wetting of the filler requiring only a very short time. Carbon black was likewise readily wet and compounded with such a composition. Attapulgus clay was also mixed into a similar rubber-resin composition. This material, however, is not as easily wet by the rubber-resin composition with the result that a dust of the filler remains on the surface which is consequently dry and not sticky as with the preceding two fillers. Various other materials of this nature may be compounded to suit particular needs, as will be recognized by those skilled in the art.

Another modification lies in the use of the resin, plasticized to an M. P. of below 95° C., in emulsion form mixed with latex. An example of this type compound was made as follows:

A soft resin, made up of 33 parts by weight of a pinene resin of 135° C. M. P. modified with 21 parts by weight of white mineral oil was emulsified using a potassium stearate soap in 40 parts by weight of water. The emulsion was formed with both the resin and water above the melting point of the resin, so that both were liquids. Agitation was continued until the emulsion had cooled to room temperature. To a portion of this resin emulsion was now added, with agitation, sufficient latex of 60 per cent rubber solids content that the solids content of the mixture was 90 per cent modified resin and 10 per cent rubber. A smooth emulsion resulted which, when spread on paper, showed satisfactory adhesive properties, possessing tack almost immediately after application. Using another portion of the resin emulsion, latex was blended therewith to yield a solids content in the emulsion mixture of 60 per cent of modified resin and 40 per cent of rubber. Here again a smooth emulsion resulted, with even better adhesive and binding properties than the first. An advantage of this type of compound is that it may be diluted with water to suit individual purposes at very little expense.

From what has been said it will be understood that through the practice of the invention rubber-resin compositions of highly desirable quality are provided for various uses to which such compositions are put.

According to the provisions of the patent statutes I have explained the principle and method of practicing my invention, and have described what I now consider to represent its best embodiment. However, I desire to have it understood that, within the scope of the appended claims, the invention may be practiced otherwise than as specifically described.

I claim:

1. As a new composition of matter, a mixture of a pinene resin emulsion and latex, said mixture being uniform and dilutable with water.

2. As a new composition of matter, an emulsion of a plasticized pinene resin mixed with latex in proportions such that the films deposited from said mixture upon evaporation of the water are adhesive in nature.

3. As a new composition of matter, an aqueous emulsion of a pinene resin and unvulcanized rubber.

LYLE M. GEIGER.